UNITED STATES PATENT OFFICE.

HENRY SAMUEL WILLIAM PALMER, OF LONDON, ENGLAND.

TEA MIXTURE.

No. 874,425.            Specification of Letters Patent.            Patented Dec. 24, 1907.

Application filed September 22, 1905. Serial No. 279,690.

*To all whom it may concern:*

Be it known that I, HENRY SAMUEL WILLIAM PALMER, a subject of the King of Great Britain and Ireland, residing at Waverley House, Mayes Road, Wood Green, London, England, have invented a certain new and useful Improved Tea Mixture, of which the following is a specification.

The object of this invention is to produce an improved tea mixture which shall be free from the deleterious effects of tea as ordinarily prepared.

In making an infusion of tea it is well known that if the tea leaves remain too long in contact with the boiling or hot water there is an excess of tannin in the infusion which is injurious to the consumer. With a view to overcome this objection preparations of tea mixed with ground malt and also with roasted and powdered malt have previously been used.

Now in this invention I employ malt to counteract the excess of tannin consequent on long infusion, but I prepare the malt and add it to the tea leaves in the following manner. I employ barley malt, oat malt or wheat malt and prepare it by means of rolling, flaking or shredding, and firing the same and afterwards blend it with the tea in various proportions according to the strength and kind of tea used. Preferably I employ barley malt and shred it by machinery or otherwise to give it a leafy appearance. I then fire it in the same way as tea is fired in order to give it the same color as tea leaf and mix it with tea in about the following proportions:

Barley malt ............................ 4 ounces
Tea .................................... 8 ounces
                                         12 ounces The other kinds of malt hereinbefore named are prepared and used in a similar way. Tea may be prepared in this way, so closely resembling orange pekoe tea as to be indistinguishable to the ordinary eye, the fired malt, in rolled, flaked or shredded form closely resembling orange pekoe.

I find that my improved tea mixture is superior in many respects to ordinary tea, as it is less astringent and has a finer flavor. Moreover my improved tea mixture is wholesome and palatable even after boiling.

A further and material advantage possessed by this tea preparation is that it may be sold more cheaply than ordinary tea.

I claim:

1. The herein-described tea mixture, consisting of tea prepared in the usual manner and fired shredded malt, the latter being in a form simulating that of the tea leaves.

2. The herein-described method of making a tea mixture, which consists in shredding and firing malt, and mixing the same with tea of similar form prepared in the usual manner.

In witness whereof I have hereunto set my hand in the presence of two witnesses.

HENRY SAMUEL WILLIAM PALMER.

Witnesses:
    R. V. ASBURY,
    G. HURD-WOOD.